June 25, 1957     A. T. SCHEIWER     2,796,881
FAUCETS WITH REMOVABLE PLUNGERS
Filed Oct. 9, 1952
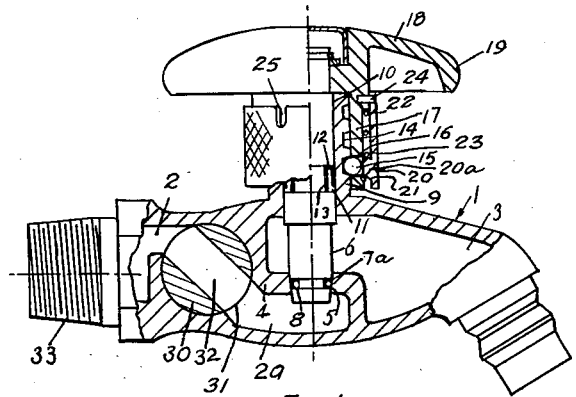
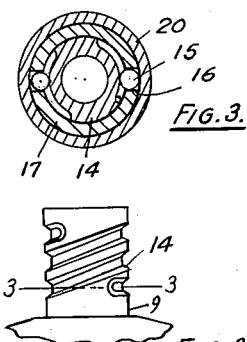
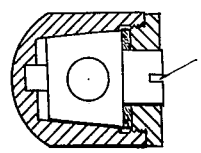
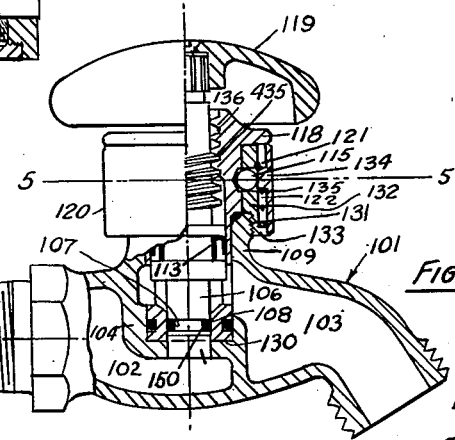
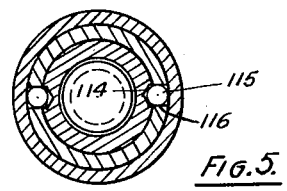
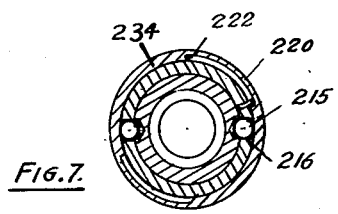
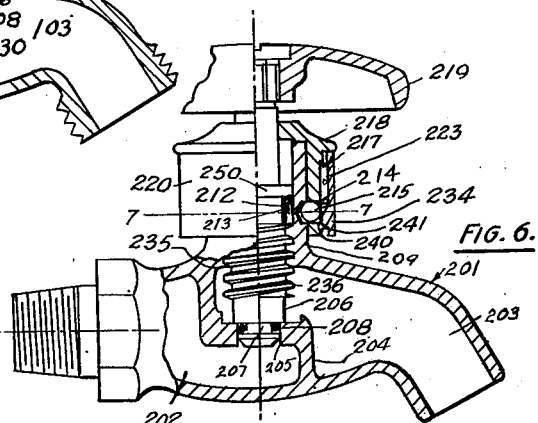
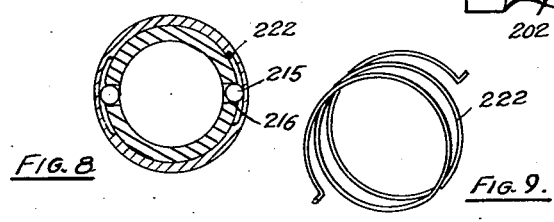
INVENTOR.
ALBERT T. SCHEIWER
BY Charles L. Lovercheck
attorney United States Patent Office 2,796,881
Patented June 25, 1957

2,796,881

FAUCETS WITH REMOVABLE PLUNGERS

Albert T. Scheiwer, Erie, Pa.

Application October 9, 1952, Serial No. 313,824

12 Claims. (Cl. 137—315)

This invention relates to quickly detachable plugs and more particularly to attaching members for attaching plungers in faucets for use in water and other fluid dispensing means.

In all faucets, according to the prior art, the plunger is held in the faucet by means of a threaded collar which holds the plunger in place in the faucet. It is common among faucets used on household appliances for the washers and other sealing means in the faucet to become worn during use so that the faucet leaks. In order to repair the faucet it is necessary to have special wrenches and other tools for removing and replacing the plunger in the faucet. The removal of the plunger in the faucet and replacing the worn parts usually requires the skill of a plumber or other mechanic. The actual work and time spent in removing the parts from the faucet and replacing them is comparatively small, however the cost of obtaining the mechanic at the proper time is frequently quite expensive. It is always necessary to shut off the water to the faucet before it can be repaired and much inconvenience is experienced in shutting off the water.

It is accordingly an object of my invention to provide a faucet wherein the plunger can be removed by any person whether or not he be a skilled mechanic.

It is another object of my invention to provide a faucet wherein the parts can be removed as a unit and replaced as such, in a minimum of time and work, and a minimum of effort.

Another object of my invention is to provide a faucet having a removable plunger incorporating a snap-on type of fitting. A further object of my invention is to provide a faucet that incorporates a shutoff means therein separate from the conventional faucet shutoff.

Another object of my invention is to provide a faucet having a removable plunger which will not be inadvertently removed.

Another object of my invention is to provide a novel type of thread for moving the plunger from open to closed position and vice-versa.

With the above and other objects in view, the present invention consists of the combination and arrangement of parts hereinafter more fully described, illustrated in the accompanying drawings, and more particularly pointed out in the appended claims, it being understood that changes may be made in the form, size, proportions, and minor details of construction without departing from the spirit or sacrificing any of the advantages of the invention.

Fig. 1 is a side view of my novel faucet having some of the parts broken away and shown in section to better illustrate the construction of my device.

Fig. 2 is a detailed side view of a part of my invention.

Fig. 3 is a cross-sectional view taken on line 3—3 of Figs. 1 and 2.

Fig. 4 is a view similar to Fig. 1 showing another embodiment of my invention.

Fig. 5 is a cross-sectional view taken on line 5—5 of Fig. 4.

Fig. 6 is a view similar to Fig. 1 showing another embodiment of my invention.

Fig. 7 is a cross-sectional view taken on line 7—7 of Fig. 6.

Fig. 8 is a view similar to Fig. 7 showing the sleeve rotated and the balls in released position.

Fig. 9 is a detailed view of the spring used in the embodiment of the invention shown in Figs. 6, 7 and 8; and Fig. 10 is a view of the auxiliary shut off of the device.

Referring now more particularly to the drawings, Fig. 1 shows a faucet 1 having an inlet passage 2 and an outlet passage 3. A partition 4 is provided between the inlet passage and the outlet passage and an aperture 5 connects the inlet passage 2 with the outlet passage 3. A plunger 6 is provided to selectively close the passage 5 and plunger 6 is provided with a groove 7 for receiving a washer or other sealing means 8 to seal the flow of water from between the inlet passage 2 and the outlet passage 3. The body of the faucet is provided with an upstanding portion 9 the inside of which is bored at 10 to slidingly receive the plunger 6. The plunger 6 has a groove 11 therein to receive a washer 12 which is fitted into the groove. The washer 12 is U-shaped in cross-section and has the legs 13 extending toward the inlet passage 3 whereby the fluid in passage 3 is sealed against escaping between the plunger 6 and the bore 10. The outside surface of the upstanding member 9 has a spiral groove 14 formed therein and balls 15 engage the groove 14. The balls 15 are carried in holes 16 in the tubular portion 17 of cap 18. Cap 18 has a hand wheel 19 attached thereto and the balls are held in engagement with the spiral groove 14 by the sleeve 20. The sleeve 20 has cam surface 21 for forcing the balls 15 into the groove 14 and spring 22 holds sleeve 20 in place over the balls 15 and urges sleeve 20 to the position shown in Fig. 1. The sleeve 20 is recessed at 23 to provide a recess for the spring 22 and one end of the spring 22 abuts against a shoulder 20a on the sleeve 20. A pin 24 is fixed in the cap 18 and a slot 25 is adapted to selectively engage the pin 24. The spiral threads 14 act as a channel and guide member for the balls 15 for moving plunger 6 out of aperture 5 so that when the hand wheel 19 is rotated in a counterclockwise direction looking downward on the cap the ball members 15 follow the spiral channel 14 upwardly and thereby raise the lower end of the plunger and the washer from the aperture 5 thereby allowing fluid to flow from the inlet passage 2 to the outlet passage 3. When it is desired to close the faucet the hand wheel is rotated in a clockwise direction whereby the balls 15 follow the spiral 14 downwardly to carry the plunger into closing relation wtih aperture 5.

A bore 31 is provided in faucet 1 and the auxiliary shutoff 30 is rotatably mounted in the bore 31. Aperture 32 is formed in shutoff 30 and when the shutoff 30 is rotated to the position shown in Fig. 1, fluid will flow from the pipe which may be connected to threads 33 into the passage 2a. When it is necessary to remove the plunger 6, the shutoff 30 can be rotated by means of a wrench or other tool. The end of the shutoff may be provided with a slot to accommodate a coin, kitchen knife or other readily available tool, such as slot 50.

If it is desired to remove the plunger from the faucet the member 20 is rotated until slot 25 registers with the pin 24 then the sleeve 20 can be raised toward the hand wheel 19 against the force of the spring 22 and the cam members 21 will allow the balls to move outwardly from the spiral groove 14 and thereby allow the plunger having the worn washer and the hand-wheel to be removed as a unit and a new plunger can be replaced, or the old plunger can be repaired and replaced. In either case, the procedure or replacing is substantially the reverse of the procedure of removing the plunger explained above.

In Fig. 1 the seat 7a of aperture 5 is tapered outwardly from side 2a to side 3 so that as washer 8 wears plunger 6 can be moved further down by rotating hand-wheel 19. It will be noted that because of the design of the washer 13 and member 9, the operation of the plunger 6 will be much smoother and hand-wheel 19 will require much less force to operate it than is required to operate the conventional faucet.

The plunger shown on the faucet in Fig. 4 is adapted for use on faucets of the type now in use in the usual home. In the embodiment of the invention shown in Fig. 4 the faucet 101 has an inlet passage 102 and an outlet passage 103. A partition 104 is provided between the inlet passage and the outlet passage and an aperture 105 connects inlet passage 102 with the outlet passage 103. A plunger 106 is disposed to selectively close the passage 105 and plunger 106 has groove 107 for receiving a washer 150 or similar sealing means.

The tubular portion 132 is threaded at 131 to be received by mating threads on upstanding member 109 on faucet 101. The tubular portion 132 has holes 116 around the periphery thereof to receive balls 115. The cap member 118 has a groove 114 formed therein and balls 115 are forced into the groove 114 by the camming portion 134 on sleeve 120. The sleeve 120 is telescopically slidable on tubular portion 132 and sleeve 120 has camming portion 134 disposed around the periphery thereof and camming portion 134 forces balls 115 into engagement with the groove 114 when the sleeve is moved to the position shown in Fig. 4. The spring 135 is provided in recess 122 and spring 135 abuts against the shoulder which carries cam 134 and the other end of the spring abuts against the shoulder 133 on the tubular portion 132. The spring 135 normally urges the sleeve 120 toward the position shown in Fig. 4. The cap 118 is threaded at 136 to receive male threads 435 on the plunger 106. When the hand wheel 119 is rotated in a counterclockwise direction the male threads 435 move on female threads 136 to move the plunger 106 out and which carries the washer 107 out of engagement with seat 108 on insert 130 which surrounds aperture 105. A washer U-shaped in cross section is shown at 113 which prevents water from passing upward between the plunger 106 and the cap 118.

When it becomes desirable to remove the plunger for inspection or to replace worn parts of the seating arrangement or repair the faucet in other ways the operator will grasp the sleeve 120 and pull it downward or toward the faucet. This will cause cam surfaces 134 to allow balls 115 to move outwardly out of the slot 114 and thereby release the cap 118 so that the entire assembly including the hand-wheel and the plunger 106 can be removed from the faucet. This operation can be done by any person even though he be not a skilled mechanic and without the use of tools.

In the embodiment of the invention shown in Figs. 6, 7, and 8 the faucet 201 is provided with inlet passage 202 and outlet passage 203 having the partition 204 interposed between them and the partition 204 provided with an aperture 205.

The plunger 206 has the groove 207 formed in the lower end thereof and a washer 208 is provided in the groove 207 to form a seal between the surfaces of the aperture 205 and the plunger 206. The plunger 206 has threads 236 formed thereon and a groove 211 wherein a U-shaped packing washer 212 has legs 213 which form a seal to prevent liquid from escaping from passage 203 past the plunger 206 and the upwardly extending portion 209. Plunger 206 has a hand-wheel 219 attached to the upper end thereof to rotate the plunger 206. The male threads 236 engage female threads 235 on the outwardly projecting member 209. The outwardly projecting member 209 has grooves 214 formed therein to accommodate balls 215. Balls 215 are supported in holes 216 in the tubular portion 217 attached to a cap 218. A sleeve 220 is provided having shoulders 234 formed thereon and cams 214 are formed on cap member 218. Spring 222 is disposed in the groove 223 in sleeve 220.

Sleeve 220 is held against linear movement on the cap 218 by spring 241 which is made of spring wire of the split ring type disposed in a groove 240, around the bottom end of cap 218. In order to operate the faucet the hand-wheel 219 is rotated in one direction to cause the male threads 236 to climb upward in the female threads 235 thereby moving the plunger, including the washer 208, out of engagement with the seat 205 to allow fluid to flow from the inlet passage 202 to the outlet passage 203. Ring 250 will move upward as the hand wheel is rotated until ring 250 engages the upper inner part of cap 218. If it becomes desirable to remove the entire plunger assembly in order to inspect or replace the seat 205 or the washer 208 it is merely necessary to twist the sleeve 220 against the force of the spring 222 and thereby allow the balls 215 to move past the cam members 214 and thereby move outward from engagement with the holes 216 in the top of the vertical member 209. The hand wheel 219 can be further rotated to disengage the threads 236 from the threads 235 and the entire plunger assembly can be pulled out. Because of the simplicity of the removal of this plunger assembly it is possible for an ordinary housewife or other unskilled person to remove the plunger assembly and replace it with a new assembly thereby eliminating the necessity of employing a skilled mechanic or plumber to repair the faucet and thereby save considerable plumbing bills.

From the foregoing it will be evident to those skilled in the art that I have provided a faucet which is simple in construction, economical to manufacture and the parts of which can be replaced without the necessity of employing a skilled mechanic to do the job.

In the foregoing specification, I have set forth the invention in its preferred practical forms but I am aware that the structure shown is capable of modification within the range of equivalents without departing from the invention which is to be understood is broadly novel as is commensurate with the appended claims.

I claim:

1. A faucet comprising a hollow body, a hollow member extending from said body, a helical groove in the outer surface of said hollow member, a plunger slidably disposed in said hollow member for closing an opening through the hollow in said body, a cap supported on said plunger, balls, means supported on said cap supporting said balls, a sleeve supported on said cap extending around said hollow member and movable relative thereto, and cam means on said sleeve engaging said balls and adapted to move said balls into said groove, said sleeve being movable to move said cam means to release said balls to allow said balls to move out of said groove, said plunger being rotatable in said hollow member rotating said cap and said balls therewith to move said balls along said helical groove whereby said plunger is moved axially to open said opening through said hollow body.

2. A faucet comprising a hollow body, an apertured partition in said body, a plunger movably mounted in said body in a position to close the aperture in said partition, means to support said plunger in selected positions, said means comprising an upstanding annular portion on said body having a circumferential helical groove in the outer periphery thereof, a rotatable sleeve attached to said plunger and slidably engaging the outer surface of said upstanding portion, pawl means supported on said sleeve, and means on said sleeve adapted to move said pawl means into engagement with said groove in said upstanding portion, said means to move said pawl means comprising a member slidable on the external surface of said sleeve.

3. The faucet recited in claim 2 wherein said slidable member is rotatable on said sleeve to move said pawl means out of engagement with said groove.

4. A faucet comprising a hollow body member, an apertured partition in said body member, a plunger adapted to move into sealing relation with said aperture in said partition, a cap slidably supported on said plunger, means on said plunger limiting the relative sliding movement of said cap and said plunger and holding said plunger and said cap together as a unit, means to support said cap on said body member, said means comprising a circumferential groove in said body member concentric to said plunger, balls supported in said cap and extending into said groove, a sleeve telescopically supported on said cap and having a camming surface thereon holding said balls into said groove to lock said balls in said groove whereby said cap is secured to said body member, said sleeve being slidable to move said camming surface out of engagement with said balls, allowing said balls to be free to move out of said groove, and means on said plunger supported on said body member urging said plunger into said aperture when said plunger is rotated in a first direction, said means urging said plunger out of said aperture when said plunger is rotated in a second direction.

5. The faucet recited in claim 4 wherein said means on said plunger supported on said body member for urging said plunger into and out of said aperture comprises an upstanding threaded portion on said body member and a threaded portion on said plunger engaging said threaded body portion, sealing means being provided between the plunger and hollow member.

6. The faucet recited in claim 5 wherein said sealing means comprises a U-shaped packing washer.

7. A faucet comprising a hollow body member, an apertured partition in said body member, a plunger adapted to move into sealing relation with said aperture in said partition, a cap supported on said plunger, means on said plunger holding said plunger and said cap together as a unit, means to support said cap on said body member, said means comprising a circumferential groove in said body member concentric to said plunger, balls supported in said cap for radial movement into said groove, a sleeve telescopically supported on said cap and having a camming surface thereon positioning and locking said balls in said groove whereby said cap is secured to said body member, said sleeve being slidable to move said camming surface out of engagement with said balls, allowing said balls to be free to move out of said groove, said means to support said cap on said body member urging said plunger into said aperture when said plunger is rotated in a first direction, and urging said plunger out of said aperture when said plunger is rotated in a second direction.

8. The faucet recited in claim 7 wherein an auxiliary shutoff means is provided in said faucet body comprising a shutoff member rotatably mounted in said body member.

9. The faucet recited in claim 7 wherein the plunger engages a tapered seat in said body member to stop the flow of fluid therethrough.

10. The faucet recited in claim 7 wherein said plunger is provided with an O-shaped washer thereon adapted to move with said plunger into sealing engagement with the walls of said hollow body.

11. A faucet comprising a hollow body, a hollow member extending from said body, a helical groove in said hollow member, a plunger supported on said hollow member and extending therein in closing relation with the hollow in said body, a cap carrying said plunger and disposed around said hollow member, cooperating means on said body and said plunger to control flow through said body, balls carried by said cap and adapted to move into said helical groove, and a sleeve on said cap to hold said balls in said groove, said sleeve being telescopically slidable to allow said balls to move out of said groove whereby said plunger may be removed from said faucet.

12. The faucet recited in claim 2 wherein said hollow body has a transverse aperture spaced from said partition and a shutoff plug is disposed in said transverse aperture whereby the flow of fluid through said hollow body may be shut off, said plug having a radially extending slot in the outer end thereof, said slot being adapted to receive a coin for rotating said shutoff plug.

References Cited in the file of this patent

UNITED STATES PATENTS

| | | |
|---|---|---|
| 389,603 | Schutz et al. | Sept. 18, 1888 |
| 1,071,462 | Regas et al. | Aug. 26, 1913 |
| 1,212,104 | Procker | Jan. 9, 1917 |
| 1,892,344 | Huber | Dec. 27, 1932 |
| 2,585,667 | Meador | Feb. 12, 1952 |

FOREIGN PATENTS

| | | |
|---|---|---|
| 411,262 | France | Apr. 8, 1910 |